US008931658B2

(12) United States Patent
Matson

(10) Patent No.: US 8,931,658 B2
(45) Date of Patent: *Jan. 13, 2015

(54) PORTABLE DRIP CONTAINMENT DEVICE APPARATUS AND METHOD

(71) Applicant: Mark Matson, Fort Worth, TX (US)

(72) Inventor: Mark Matson, Fort Worth, TX (US)

(73) Assignee: Matson, Inc., Fort Worth, TX (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/850,834

(22) Filed: Mar. 26, 2013

(65) Prior Publication Data

US 2013/0206776 A1  Aug. 15, 2013

Related U.S. Application Data

(63) Continuation of application No. 13/448,542, filed on Apr. 17, 2012, now Pat. No. 8,479,946.

(60) Provisional application No. 61/495,141, filed on Jun. 9, 2011.

(51) Int. Cl.
  *B65D 1/34* (2006.01)
  *F16N 31/00* (2006.01)

(52) U.S. Cl.
  CPC .............. *F16N 31/00* (2013.01); *F16N 31/006* (2013.01)
  USPC ........................................................ 220/573

(58) Field of Classification Search
  CPC ....................................................... B65D 1/34
  USPC .......... 220/571, 573; 141/86, 87, 98; 184/106
  See application file for complete search history.

(56) References Cited

U.S. PATENT DOCUMENTS

| 321,732 | A | 7/1885 | Lee |
| 1,521,300 | A | 12/1924 | Johnson |
| 1,664,887 | A | 4/1928 | Kirkham et al. |
| 2,567,514 | A | 9/1951 | Hoffman |
| 2,672,628 | A | 3/1954 | Spanel |
| 2,757,478 | A | 8/1956 | Borland |
| 2,938,602 | A | 5/1960 | Horrocks |

(Continued)

FOREIGN PATENT DOCUMENTS

EP  1616816 B1  12/2008

OTHER PUBLICATIONS

Product Illustration; detailking.com; © 1999-2013; 5 pages.

(Continued)

*Primary Examiner* — Anthony Stashick
*Assistant Examiner* — Jennifer N Zettl
(74) *Attorney, Agent, or Firm* — Whitaker Chalk Swindle & Schwartz PLLC; Stephen S. Mosher

(57) ABSTRACT

A portable drip containment device comprises a tray formed of fuel and chemical resistant fabric. Side walls of the tray are supported by removable bolster segments formed of resilient open cell foam members enclosed within sleeves. The bolster segments are wrapped within a flap of material extending from under the side wall of the tray and around the bolster segments to secure them to the side walls. The outer edge or end of the flap is secured to the side wall. The bolstered side walls may be repeatedly driven across by industrial vehicles without harming the bolster or side wall. The modular bolster segments may be removed and easily stacked, and the tray folded and rolled into a compact modular form, for transport, storage, and reuse of the portable containment tray.

9 Claims, 8 Drawing Sheets

(56) References Cited

U.S. PATENT DOCUMENTS

| | | |
|---|---|---|
| 3,202,335 A | 8/1965 | Budd |
| 3,430,271 A | 3/1969 | Junod-Diele |
| 3,637,454 A | 1/1972 | Pavernick |
| 3,661,227 A | 5/1972 | Robel et al. |
| 3,933,002 A | 1/1976 | Vickery |
| 4,334,331 A | 6/1982 | Santo |
| 4,607,402 A | 8/1986 | Pollard |
| 4,671,024 A | 6/1987 | Schumacher |
| 4,875,537 A | 10/1989 | Garnatz et al. |
| 5,088,139 A | 2/1992 | Bloom |
| 5,090,588 A | 2/1992 | Van Romer et al. |
| 5,099,872 A | 3/1992 | Tarvin et al. |
| 5,128,189 A | 7/1992 | Bartlett |
| D334,238 S | 3/1993 | Spedini |
| 5,206,964 A | 5/1993 | Wilson, Sr. |
| 5,316,175 A | 5/1994 | Van Romer |
| 5,351,348 A | 10/1994 | Beger |
| 5,435,458 A | 7/1995 | Bishop |
| 5,464,492 A | 11/1995 | Gregory et al. |
| 5,511,683 A | 4/1996 | Dailey |
| 5,567,259 A | 10/1996 | Gregory et al. |
| 5,689,920 A | 11/1997 | Hallsten |
| 5,743,674 A | 4/1998 | Healy |
| 5,762,233 A | 6/1998 | Van Romer |
| 5,924,461 A | 7/1999 | Shaw et al. |
| 5,948,250 A * | 9/1999 | Middleton .................... 210/232 |
| 5,975,332 A | 11/1999 | Bishop |
| 6,019,243 A | 2/2000 | Marino |
| 6,092,686 A | 7/2000 | Shaw et al. |
| 6,189,721 B1 | 2/2001 | Bishop |
| 6,276,406 B1 | 8/2001 | Mathieu |
| 6,880,720 B2 | 4/2005 | Van Romer |
| 6,880,721 B1 | 4/2005 | Barrett et al. |
| 6,938,790 B2 | 9/2005 | Hughes |
| 6,957,546 B1 | 10/2005 | Farley et al. |
| 6,988,848 B2 | 1/2006 | Arsenault et al. |
| 7,374,062 B2 | 5/2008 | Van Romer |
| 7,428,911 B1 | 9/2008 | Frazier |
| 7,506,777 B2 | 3/2009 | Ramp et al. |
| 8,025,595 B2 | 9/2011 | Henning |
| 8,177,087 B2 | 5/2012 | Noble et al. |
| 8,479,946 B2 * | 7/2013 | Matson .......................... 220/573 |
| 8,590,727 B2 | 11/2013 | Dupuis et al. |
| 8,740,006 B2 * | 6/2014 | Matson .......................... 220/571 |
| 2003/0029873 A1 | 2/2003 | Moffat et al. |
| 2007/0278224 A1 | 12/2007 | Van Romer |
| 2009/0321351 A1 | 12/2009 | Young |
| 2010/0294779 A1 | 11/2010 | Barrett et al. |
| 2012/0076588 A1 | 3/2012 | Dupuis et al. |
| 2012/0219746 A1 | 8/2012 | Powell |
| 2013/0121768 A1 | 5/2013 | Powell et al. |
| 2013/0206251 A1 | 8/2013 | Harr |
| 2013/0259574 A1 | 10/2013 | Shaw |
| 2014/0030022 A1 | 1/2014 | Nicholas et al. |

OTHER PUBLICATIONS

Product Illustration; ENPAC; no date; 12 pages.
Product Illustration; Unit Liner Co.; no date; 2 pages.
Product Photo; no name of source; no date; 1 page.
Product Illustration; AbsorbentsOnLine.com; 4 pages.
Photo Gallery; Interstate Products, Inc.; no date; 2 pages.
Product Description; Pactec, Inc.; © 2014; 1 page.
Product Description; New Pig Corp; © 2014; 4 pages.
Product Description; ENPAC; © 2012; 9 pages.
Product Illustration; Detail King; © 1999-2013; 10 pages.
Product Illustration; SpillContainment.com; 4 pages.
Product Illustration; ENPAC; no date; 5 pages.
Product Illustration; enviroguardcontaiment.com; no date; 1 page.
Product Illustration; Granite Environmental; no date; 3 pages.
Product Illustration; InterstateProducts.com; Feb. 25, 2014; 3 pages.
Product Description; Readycontaiment.com; Feb. 25, 2014; 3 pages.
Product Illustration; S&G Diversified Products; no date; 1 page.
ENPAC (reg. tm.); website products brochure; 4 pages; www.ENPAC.com.
PIG (reg. tm.) "Drive-Thru Washdown Center"; product webpages, 2 pages; copyright 2012; www.newpig.com.
SPILL 911 (reg. tm.); product webpages; 2 pages; copyright 1996-2010; www.spill911.com.

* cited by examiner

PORTABLE DRIP CONTAINMENT DEVICE APPARATUS AND METHOD

CROSS-REFERENCE TO RELATED APPLICATION

This application is a Continuation of U.S. patent application Ser. No. 13/448,542 filed, Apr. 17, 2012 and entitled PORTABLE DRIP CONTAINMENT DEVICE APPARATUS AND METHOD, which claims priority from U.S. Provisional Patent Application Ser. No. 61/495,141, filed Jun. 9, 2011 and entitled PORTABLE DRIP CONTAINMENT DEVICE, by the same inventor.

BACKGROUND OF THE INVENTION

1. Field of the Invention

The present invention generally relates to spill containment methods and more particularly to portable apparatus for catching and containing spills of toxic or environmentally hazardous materials from industrial vehicles and related equipment.

2. Background of the Invention and Description of the Prior Art

In a number of industrial processes, machine equipment that includes apparatus that transports, dispenses, or utilizes materials—liquid or dry aggregate—that may be toxic to living things or otherwise harmful to the environment requires some form of protective or containment device or method to avoid contamination thereof when the vehicle or other machine is not in motion. In one example, machinery used for drilling oil and gas wells, especially those used in a process called hydraulic fracturing (often: "fracing") presents a challenge to avoid spills on the ground in such installations. In another example, loading or unloading chemicals on/from a vehicle, particularly in a remote or environmentally sensitive area, presents a need for a spill containment device. Even though well-thought-out and carefully implemented procedures for handling such materials may be in place and conscientiously used, accidents can and do occur that may result in harm to the surroundings where such equipment is located.

Constructing paved driveways or pads is one solution that enables relatively easy clean up of a spill. However, a paved surface is a permanent fixture that entails substantial expense to provide and thus is not suitable for machinery or installations where such equipment is used that is moved from place to place. Such is the case with oil and gas drilling machinery. Conventional forms of spill-containment devices may be constructed of light-weight fabric materials to provide devices that are portable and reusable. However, such materials, to provide for convenient assembly and disassembly are necessarily flexible and some way to provide rigid side walls or fixed support for the non-rigid sidewalls is required. Various arrangements and configurations of mechanical braces, collapsible or otherwise, or rigid or inflatable side members, have been proposed to support the side walls of the containment device. These have the disadvantage of requiring one or more of relatively cumbersome installation, assembly, adjustment, and disassembly procedures in use, require tools during use, or require a source of compressed air, for example, to inflate supporting structural elements of the containment unit.

What is needed is a containment method and/or apparatus having a minimum of components that can be easily installed, dismantled, and transported from place to place, even to remote areas, and that may be reused in a variety of situations, yet provides a reliable barrier to spills upon the surface of the ground.

SUMMARY OF THE INVENTION

Accordingly there is disclosed a portable drip containment device for use under a vehicle that provides an advancement in the state of the art, comprising a tray formed of chemically resistant fabric and having a floor panel and defined side walls of a predetermined height surrounding the floor panel; At least one wing flap extending outward from an underside of the tray below each side wall; a deformable bolster assembly surrounding the tray and removably attached to the side of each side wall; wherein the bolster assembly is secured to each side wall by the at least one wing flap wrapped around the bolster assembly disposed adjacent each side wall and attached to the upper edge of each side wall.

In other aspects the bolster assembly is formed of a plurality of elongated and deformable bolster segments formed of open cell foam members individually enclosed in sleeves formed of the chemically resistant fabric and disposed end-to-end around the perimeter of the containment tray.

In another aspect a bolster member is formed of a resilient foam material preferably having a cross section shape selected from the group consisting of right triangle, rectangle, square, and other quadrilateral having at least one right angle corner.

In other aspects no braces or rigid or inflatable members are required to support the side walls of the containment tray and hook and loop or other hand-operated fasteners are used to advantage to provide easy assembly and disassembly of the containment device without tools by one person.

In other aspects handholds may be provided to enable ease of positioning the containment device and reinforcement gussets are provided at high stress portions of the containment device for durability.

In another aspect the containment tray, following removal of the bolsters, may be folded and rolled into a compact cylindrical package for transport, storage, and reuse. Further, the individually sleeved bolsters may be stacked for transport, storage, and reuse.

Accordingly there is also provided a method for supporting the side walls of a portable drip containment tray, comprising the steps of enclosing each one of a plurality of resilient bolster members within a chemically resistant fabric sleeve to form reusable bolster segments; attaching at least one wing flap to the perimeter of the tray along each side thereof and below the side walls and extending outward from the perimeter; wrapping the reusable bolster segments placed end-to-end around the perimeter of the tray within the wing flaps; and securing the outer edge or end of the wing flaps to an upper edge of the side wall.

In another aspect the method includes the steps of precutting the resilient bolster members to one of a plurality of standardized lengths; surrounding a bolster member with the coated fabric having sufficient excess width and length to permit gathering the excess width to create a side seam and the excess length to form a package wrap end panel at each end of the bolster member; and enclosing the bolster member within the sleeve to prevent liquids from entering the bolster segment and protect the bolster members from abrasion or other damage.

In another aspect the method includes the steps of placing the bolster segments on top of the wing flaps and against the side walls of the tray and lifting said distal edge or end of each said wing flap upward and around said bolster segment to secure it to said upper edge of said side wall using the hook and loop or other hand-operated fasteners provided.

In another aspect the method includes the steps of attaching handholds, each anchored to an upper portion of the side walls and which may be disposed at predetermined intervals around the perimeter of containment tray.

In other aspects, the method includes the step of enabling assembly and removal of the bolster segments without tools; and folding and rolling said containment tray into a compact package for transport, storage, and reuse; and stacking said bolster segments for transport, storage, and reuse.

DETAILED DESCRIPTION OF THE INVENTION

Introduction

Figure 1:
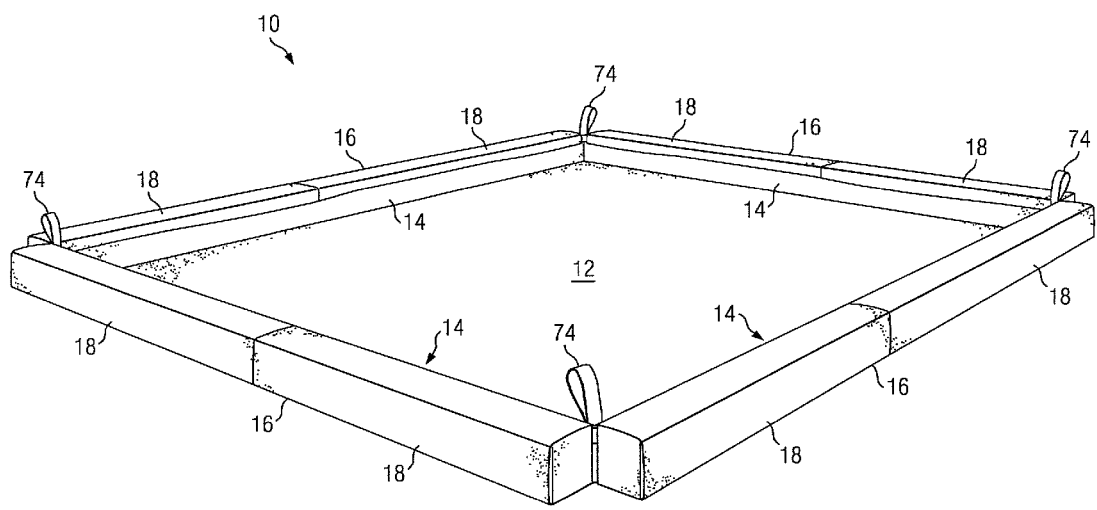
FIG. 1 illustrates one embodiment of a portable spill containment device according to the present invention.

A portable drip or spill containment device (also called a containment tray) is disclosed that provides an advance in the state of the art and combines low cost, light weight, a minimum of component parts, ease of portability, storage, installation without tools, and reuse. Unlike prior art spill containment devices, the containment device designed according to the present invention employs flexible side walls supported by fully deformable, resilient bolsters to permit wheeled vehicles to drive or roll unto the device without manipulation or maneuvering of the side wall structures. The device may be easily assembled and disassembled without tools, is portable, and may be reused many times over. When folded and rolled up, the containment tray is portable and can be carried and installed by one person. The bolster structure is formed of a plurality of resilient bolster segments that are uniform in shape and readily stackable in a small footprint. These modular features make the device easily transported or stored.

The portable containment device or tray may be constructed for any size vehicle or mobile container by attaching multiple panels of a fuel and chemical resistant fabric together and using as many of the sleeved bolster members (bolster segments) as needed. In most applications a small number of standard-length bolster segments may be used to construct a wide variety of sizes of the containment device. The containment device may generally be any shape, although for most applications, a rectangular or square shape is convenient. The design of the containment device described herein is readily adapted to other shapes. In some applications, a combination of several containment devices used together may be preferred.

The basic containment device comprises a fabric tray having a bottom panel and low profile side walls to retain spilled liquids and debris. The side walls, which are formed as upward extensions of the bottom panel so that liquids are retained, further employ a unique form of positive support assembled from a minimum of components and that is easily installed without tools. The support for the side walls is provided by an assembly of bolster segments (a bolster assembly) surrounding the containment tray and placed against the outer side of the side walls. The bolster segments are fully deformable, so that they may compress when driven over and readily return to their original shape following compression. To form the bolster segments, resilient bolster members are individually enclosed in sleeves to protect them from abrasion and deterioration from contact with rocks, debris, harsh chemicals and the like. The preferred enclosing covering or envelope should also be impervious to liquids except for an air vent at the upper portion of each end of the bolster segment to permit air or liquids to escape when bolsters are compressed or to drain liquid that may have entered within the sleeves. The air vents also permit more rapid restoration of the resilient bolster material to its quiescent condition after being compressed.

Wing flaps, attached to the perimeter of the tray along the underside edges of the containment tray extend outward from the side walls sufficiently to wrap around the bolster segments and attach to the upper edges of the side walls of the tray, thereby enclosing the bolster segments and securing them next to the side walls to provide full support of the side walls. The side walls are thus supported and maintained in a vertical position against collapse to contain a substantial amount of spilled materials while permitting vehicles to drive over the side walls and bolster members without damage when entering or leaving the containment device. It is a distinct feature of the present invention that no mechanical braces, collapsible or otherwise, or rigid or inflatable members are required to support the side walls of the containment device. Further, the installation and take down of the bolster components without tools is facilitated by the design of the containment device, without impairing it's portability. The illustrated design, which makes use of the well known hook and loop type of fastener, is not limited to such fasteners. For example, snap fasteners or spring clips or laces that may be tied may be suitable, particularly for smaller forms of the containment device described herein. Wing flaps may be configured to fully enclose the bolster segments or be configured as narrower flaps that are used at intervals around the perimeter of the containment tray yet still sufficient to retain the bolsters in position to support the side walls.

Pull handles, in one example formed by optional loops fabricated of heavy duty webbing strap, may be attached to the containment device, for example at each corner of the containment tray for ease of handling and positioning the tray. Further, the pull handles or loops, for larger sizes of the containment device, may be advantageously attached to the side walls at intervals around the perimeter of the containment tray in addition to or alternatively to the corner placement.

In use, the containment tray portion of the containment device is oriented according to the desired compass with its wing flaps fully extended. The bolster segments are then placed against the outside of the side walls of the containment tray with the hook strips of the bolster segments aligned with and adjacent the corresponding loop strips disposed along the outside upper edge of the side walls. After the bolster segments are thus attached to the side walls of the containment tray, each wing flap is wrapped upward and around the attached bolster segment and the outer edge or end of the wing flap with the hook strip there along is folded or wrapped over and attached to the loop strip on the inside upper edge of the side wall, thus securing the bolster segment to the side wall to provide a stable wall structure. Thus supported, the bolster assembly prevents the side wall from collapsing or rolling over and diminishing the integrity of the containment device.

One typical example of use of the portable spill containment device disclosed herein is at an oil & gas drilling site. Servicing vehicles may be driven or rolled on to the spill containment device such that any spills that may occur from the vehicle or the hoses or containers attached to it will be contained within the area bounded by the side walls of the device. The spilled substances may then be removed from the containment device without them being absorbed into the surrounding area. In a second example of use, two vehicles may each be positioned on separate containment devices. Placement of a vehicle is achieved by merely driving or rolling upon the containment device and parking it in a central position on the tray. No damage results to the bolsters or side wall when thus deformed because of the compressibility and resiliency of the materials used in the construction of the bolster assembly. Alternatively, because of the ease with which the containment device may be deployed, the bolster segments for the last side of the device may be installed after the subject vehicle or other implement or machinery is driven or placed on the containment device. The containment device may be used with vehicles of all kinds and mobile containers containing materials that may be toxic or harmful to the environment or surfaces where the vehicle or container is located.

The containment device is portable and reusable: the tray portion (bottom panel and side walls) may be easily folded and rolled into a compact barrel-like package or module, and tied with rope or elastic cords or straps, for storage and transport. The bolster, assembled of a plurality of individually sleeved foam members, called bolster segments herein, is readily disassembled from the tray and the individually sleeved members are readily stacked in a relatively small footprint for storage or transport. Both the tray portion and the bolster segments are light weight and easily handled by one person.

The portable containment device disclosed herein is constructed of only a few low cost materials, all readily available in bulk: liquid-and-chemically impervious tarp fabric, resilient open cell foam, hook & loop or other hand-operated fasteners, webbing strap, and heavy duty thread. Fabrication operations involve cutting, sewing, vulcanizing, and welding (e.g., "heat sealing"), all well within the capabilities of manufacturers of tarpaulin, tent and awning products, etc.

DETAILED DESCRIPTION

FIG. 1 illustrates one embodiment of a portable spill containment device 10 according to the present invention. In the description that follows, dimensions given are for a typical example that is large enough to accommodate a single unit truck. Containment devices of the type described herein for smaller vehicles such as lawn tractors or mowers may be scaled appropriately. For larger vehicles such as tractor-trailer or five axle rigs, a pair of containment devices such as are described herein may be used effectively, placed end-to-end. One practical upper limit to the size of a portable containment device is the ability of one person to carry or maneuver a folded and rolled-up tray portion of the device as will be described for FIG. 14.

The containment device 10 depicted in FIG. 1 is not drawn to scale in order to show clearly the components of the device. For example, the plurality of bolster segments 18 that make up the bolster assembly 16 may typically be each four or seven feet long and arranged end-to-end around the perimeter of the containment tray 12. Thus the tray 12 pictured in FIG. 1 may be construed to be a square shape about eight or fourteen feet on a side. In practice, a containment device 10 for a single unit truck would be a rectangle approximately twelve feet wide and twenty-nine feet long. These dimensions are derived from determining that a minimum number of bolster segment lengths may be used to accommodate most sizes of containment devices. One preferred set of lengths for the bolster segment 18 may be, for example, three, four, and seven feet. Other length combinations are, of course, suitable, depending on the applications. In the present illustrative example of a 12 ft.×29 ft. containment device 10, one seven foot and one four foot length is used for the shorter side (7+4+2×0.5 feet for the bolster segment widths) and four each of the seven foot (4×7+2×0.5 feet) lengths are used for the bolster assembly 16 on the longer side. The tray 12 for such a device would be assembled from several sheets of the fabric material with the adjoining edges welded together to form a single liquid-impervious sheet for constructing the tray 12. See the description below for FIG. 11.

Continuing with FIG. 1, the drip pan or tray 12 is preferably formed of a PVC coated scrim material to form a durable, fuel and chemical resistant fabric. The fabric in this illustrative example is a PVC ("polyvinyl chloride") coated polyester scrim material, coated on both sides, having a rated weight of approximately 18 oz per square yard (18 oz./yd.$^2$) and found suitable for the application illustrated herein as shown herein. While lighter weight coated fabric materials may be used, it is suggested that weights below 14 oz./yd.$^2$ be avoided to ensure sufficient durability. The lighter weight materials may be adequate for small items weighing a few hundred pounds (lb.) or less such as lawn mowers, and the like. Heavier weight materials—e.g., up to approximately 24 oz./yd.$^2$—may be used but it has been found that the advantages of greater weights diminish beyond the 18 oz./yd.$^2$ figure. Further, and importantly, the 18 oz./yd$^2$ specification has been found to provide an optimum balance between portability and durability. Other materials considered in development of the present embodiment included canvas (which absorbs moisture making it subject to mildew and rot), coated nylon (which dissolves in the presence of hydrochloric acid), and polyethylene or polypropylene (which lack durability). The PVC coated polyester in this example is a woven polyester fabric having a thread count of 18×17 (warp and fill), is UV (ultraviolet radiation) resistant, and has a usable temperature range of −40° F. to 180° F.

Continuing with FIG. 1, the drip pan or tray 12 is preferably formed with side walls 14 supported on all sides by a compressible foam core bolster assembly 16 made up of bolster segments 18. The bolster segments 18 are preferably enclosed in sleeves made from the same PVC coated fabric. The containment device 10 may be sized to accommodate anything from a vehicle as small as a lawn mower to a large industrial vehicle. The vehicle or other implement or machine or storage vessel is positioned upon it such that the side walls 14 are outside the perimeter of any projection on the ground of the vehicle or other item that might leak. In the preferred embodiment, the bolster segments 18 are rigid enough to fully support the side walls 14 but compressible enough to be driven over as the vehicle is driven or rolled into position on the tray portion of the containment device 10. Also shown in FIG. 1 are handholds 74 to be described with FIG. 4 herein below.

Persons skilled in the art will recognize that the principles of the present invention illustrated by the embodiment shown and described in the drawings are readily adaptable to a wide variety of sizes and shapes of the containment device depicted herein. For example, the containment tray 12 may be round, oval or other shapes to suit the particular application. Likewise, the bolster segments 18 may be stacked to provide for the support of higher side walls 14 of the containment tray 12. One justification for the use of stacked bolster segments in such cases is that it is generally more efficient to make a small number of standard-sized bolster segments. Further, bolster segments of the sizes described herein are relatively small and light weight to facilitate ease of handling. All of these variations are contemplated as being within the scope of the invention as claimed.

Figure 2:
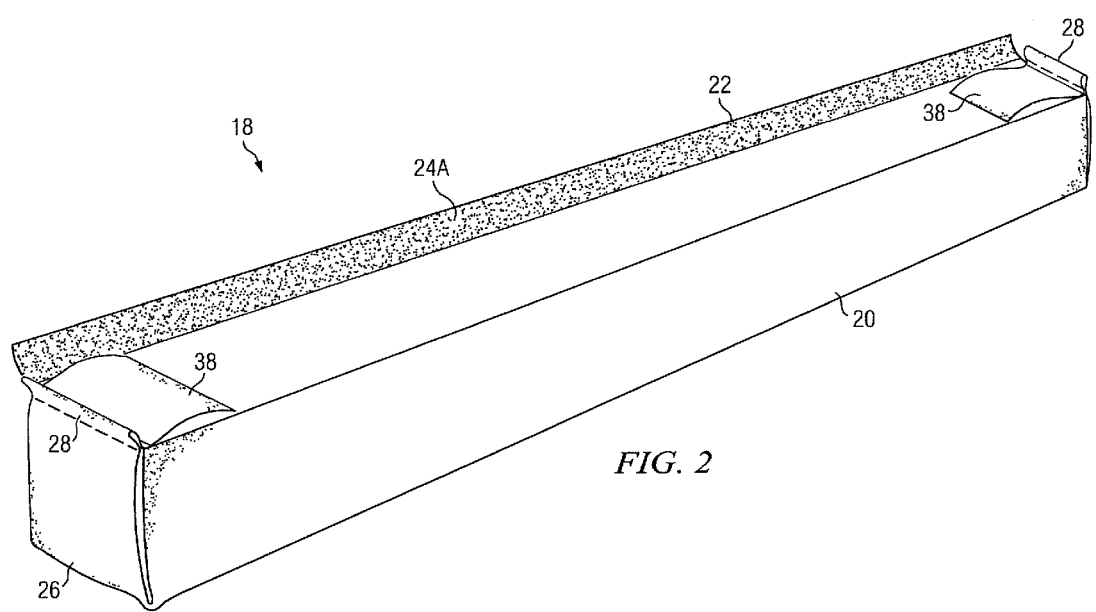
FIG. 2 illustrates an assembled bolster segment for use in the embodiment illustrated in FIG. 1.

FIG. 2 illustrates an assembled bolster segment 18 for use in the embodiment illustrated in FIG. 1, after the foam core bolster member 30 (See FIG. 6) is wrapped in the PVC coated fabric and prior to attachment to the tray portion 12 of the containment device 10. The bolster member 30, which functions as a core of the bolster segment 18, may preferably be formed of a precut length (seven feet in this example) of a solid core, open cell polyurethane foam having a density of approximately 1.8 lb/ft$^3$ and an indentation force deflection of approximately 90 lb. These figures may be varied somewhat. For example, the 1.8 lb/ft$^3$ is again chosen for a suitable balance between the weight of the bolster segment 18 and factors such as its durability and ability to maintain support of the side wall 14 of the containment tray 10. However, this nominal figure may be varied with satisfactory results within the range of approximately 1.4 to 2.2 lb/ft$^3$. Similarly, the indentation force deflection requirement may be varied within the range of 70 lb. to 110 lb. It is even possible that, in certain applications, for the density and indentation force deflection values to be suitable outside these recommended ranges without departing from the utility and principle features of the present invention.

Open cell foam is chosen for the bolster members 30 because, when compressed, the air in the cells of the foam escapes by passing from cell-to-cell, allowing the body of the foam to occupy less space. As the compressing agent is removed, air seeps back into the foam cells, causing the cells to expand back to their original size and shape. Solid foam material is preferred, as opposed to hollow bolster members, because it provides maximum support of the side walls 14 yet is still fully compressible. Further, the foam core bolster member 30 should have at least two adjoining sides meet at a right angle and have a width dimension of approximately the same size as the height of the side wall 14 of the containment tray 12. For example in a typical large containment device 10 a side wall 14 height of six inches is suitable. Thus the cross section of the bolster member 30 may be a right triangle or a rectangle having at least one six inch side or it may be cut to have a square cross section six inches square. The right angle preference is mentioned in the preceding discussion because it is advantageous to support the side walls 14 in a vertical orientation to provide optimum performance of the containment device 10. In other applications, where taller side walls 14 are need, side walls 14 of eight, ten, or twelve inches may be used. In such cases, the bolster members 30 may be sized in single units or multiple unit configurations. The bolster assembly 16 in cases using multiple bolster segments 18 may be stacked as mentioned previously.

The fabric sleeve 20, which encloses the bolster member 30 and prevents damage that may occur due to fuel, chemical or other materials coming in contact with the polyurethane foam material, is preferably fabricated from the same PVC coated polyester scrim material used for the containment tray 12. The sleeve 20 is also able to protect the foam bolster member 30 from the abrasion likely to occur from debris and when the wheels of a vehicle pass over the bolster assembly 16 portions of the containment device 10.

The exemplary embodiment of the invention described herein includes the use of hook and loop fasteners to secure the parts of the containment tray 12 and bolster assembly 16 together. The two components of the hook and loop fastener material are referred to herein as a first type and a second type. The first type may be referred to as the hook configuration and the second type as the loop configuration, although these references may be reversed without changing the meaning of the description, it only being necessary that the fastening operation is accomplished by pressing one type against the other type in any given act of fastening the two types together.

Continuing with FIG. 2, a narrow strip of fabric, flap 22 extending from the top side of the bolster segment 18 along the length thereof includes a strip of a first type 24A of a two-piece hook and loop fastener running along the length of the bolster segment 18. This first type 24A fastener (for example, the hook type) is preferably used to secure the bolster segment 18 to a respective strip of second type 24B (the complement, i.e., the loop type) of hook and loop fastener disposed along the upper portion of the side wall 14 as will be described for FIG. 3. The hook and loop fastener is chosen in this example for its durability, its ability to hold components to be joined securely, and for its ease of use without tools. Other fastening mechanisms that provide detachability without the use of tools to retain all the advantages of the invention may be selected in certain applications. The first 24A and second 24B hook and loop strips are used to attach the bolster segment 18 to the side wall 14 such that the side wall 14 is supported to its full height when installing the bolster segment 18. This feature ensures that the side walls 14 of the containment device are fully supported to best contain any substances deposited upon it.

Also shown in FIG. 2 is a view of a finished end 26 of a bolster segment 18 after the material of sleeve 20 has been trimmed, gathered, folded and stapled or sewn to form a package wrap as will be described in FIGS. 6-10 herein below. The package wrap provides a barrier to liquids, yet provides for venting of air along its upward edge as will be described. The finished end 26 includes a folded and sewn flap 28 as shown. Both ends of the bolster segment 18 are finished in the manner shown. The edge of the bolster segment 18 with the flap 28 is intended to be disposed upward when installed next to a side wall 14.

Figure 3:
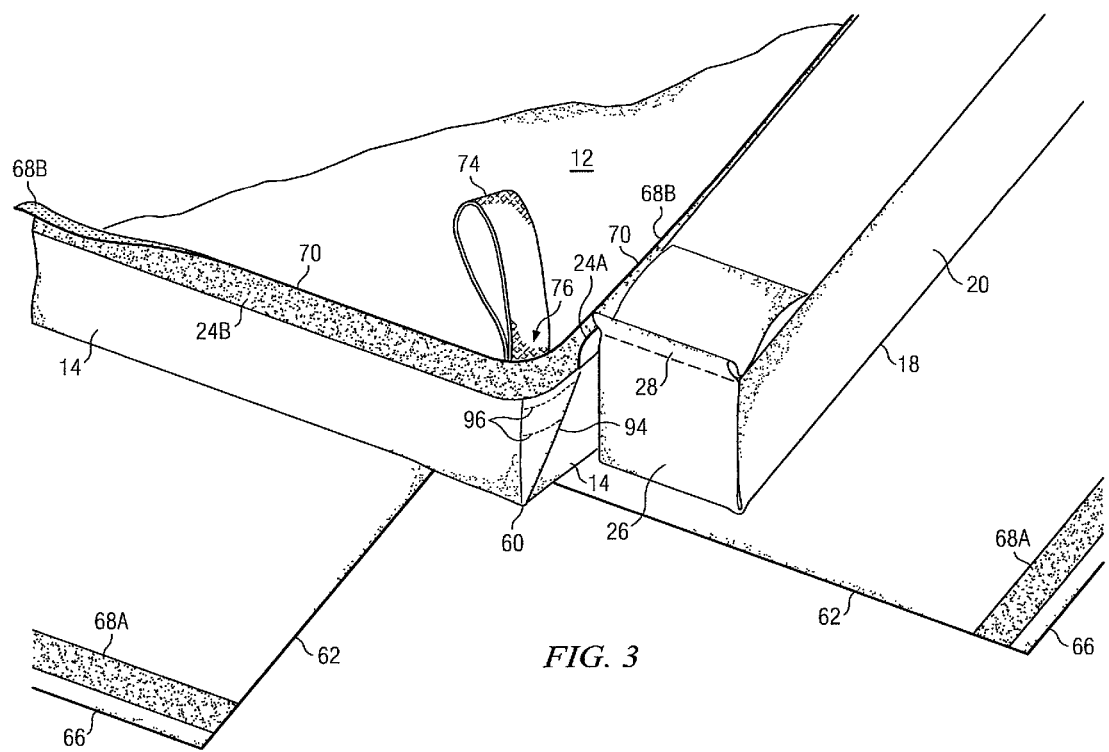
FIG. 3 illustrates a partially assembled containment device with an assembled bolster segment placed in position against one side wall of the tray portion of the containment device of FIG. 1.

FIG. 3 illustrates a partially assembled containment device 10 with an assembled bolster segment 18 positioned against one side wall 14 of the tray portion 12 of the containment device 10 of FIG. 1. The bolster segment 18 is preferably attached to one side of the tray portion 12 of the containment device 10 using the first 24A and second 24B types of the hook and loop fastener previously described. The tray portion 12 of the illustrated embodiment is constructed of a single piece (or a sheet formed of several pieces) of the same 18 oz. PVC coated polyester fabric used to wrap the foam bolster cores 30. The tray side walls 14 are formed by turning up the outer edges 70 of the tray material 82 as will be further described for FIGS. 12 and 13. At the corners 60, the triangular, folded corner 94 of the fabric is pressed together and folded around the corner 60, then secured to the adjacent side wall 14 by stitching 96 and/or vulcanizing, or welding or heat sealing. This joint is provided at each corner 60 to provide a liquid-proof container tray 12. The height of the side wall 14 may typically be approximately 6 inches, although other heights in the range between 4 and 12 inches may be preferable for some applications as previously described.

Extending under the wrapped bolster segment 18 on each side of the tray portion 12 of the containment device 10 is a wing flap 62 (alternately called an extension flap 62 herein) of a predetermined width. In this exemplary case this width measured from the bottom of the side wall 14 at the perimeter of the containment tray 12 may be slightly greater (by approximately 3½ inches) than ¾ of the perimeter dimension of the cross section of the wrapped bolster segment 18. In other words, if the bolster core 30 has a square cross section of 6 inches×6 inches, the cross section will have a perimeter of 24 inches. The wing flap 62 will wrap around three of those four sides (or 18 inches) of the sleeved bolster segment 18 and must also have about 4½ inches of additional space to allow about one inch for sealing or sewing the wing flap's inner edge to the underside of the tray 12 and about 3½ inches along the outer edge of the wing or extension flap 62 to accommodate a strip of one of the first 24A and second 24B types of a hook and loop fastener. These dimensions are approximate and may vary in practice or with particular applications. Thus the predetermined width of the wing flap 62, measured from the side wall 14 of the tray 12 after being attached thereto is approximately 20¼ inches in this example. Before attachment to the tray 12 the total width of the wing flap 62 should be approximately 22½ inches. As further described in FIG. 11 the inner edge (about one inch wide) of the extension flap 62 is attached to the tray portion 12 at a point about seven inches in from the outer edge 70 of the wing flap (which would be just below the side wall 14 when the tray 12 is completed) by first vulcanizing the two parts together and then applying stitched seams (See FIG. 5) along the portions of the joint that are in contact.

Persons skilled in the art will recognize that the dimensions given are exemplary and intended as a guide to the construction. Scaling the dimensions of the components of the containment device is of course contemplated to adapt to particular circumstances such as the overall size of the containment device 10, the cross section dimensions of the foam core material used in the bolster segments, the width of the strip of hook and loop or other type of fastener employed, etc., considerations that may come into play for constructing smaller versions of the containment device 10. Moreover, as mentioned elsewhere herein, the wing flaps may be configured to fully enclose the bolster segments or be configured as narrower flaps that are used at intervals around the perimeter of the containment tray yet still sufficient to retain the bolsters in position to support the side walls.

Continuing with FIG. 3, the extension flap 62 on each side of the containment device 10 also includes a strip of a first type (hook) 68A of a hook and loop fastener sewn along its outer-most edge 66 as previously described. This first type 68A of hook and loop fastener is used to secure the outer edge of the wing flap 62 to a corresponding complement type strip—e.g., a second type (loop) 68B—of hook and loop fastener located near the top edge 70 on the inside of the side wall 14 of the tray portion 12 of the containment device 10. After the bolster segment 18 is placed next to the outside of the side wall 14, the extension or wing flap 62 is wrapped around the bolster segment 18 and its edge 66 pressed against the inside of the top edge 70 of the side wall 14 to activate the first 68A and second 68B strips of the hook and loop fastener together. This step, shown completed in FIG. 4, secures the bolster segment 18 to the side wall 14 and supports the side wall 14 to maintain the integrity of the containment device 10 for its intended purpose, to contain any spills within the containment tray 12 that fall upon it. The bolster assembly 16 provides stability for the side walls 14 even when driven over by vehicles or stepped upon by workers. This stability is an important attribute of the invention for containing any liquids spilled or otherwise deposited upon the containment device. It may be recognized that the second type hook and loop material used for the fasteners 24B and 68B may be formed by a single four-inch wide strip of the second type (loop) of hook and loop fastener material by folding it lengthwise over and along the upper edge 70 of the side wall 14 and stitched to the side wall 14 with the same size 138 bonded thread used elsewhere.

Figure 4:
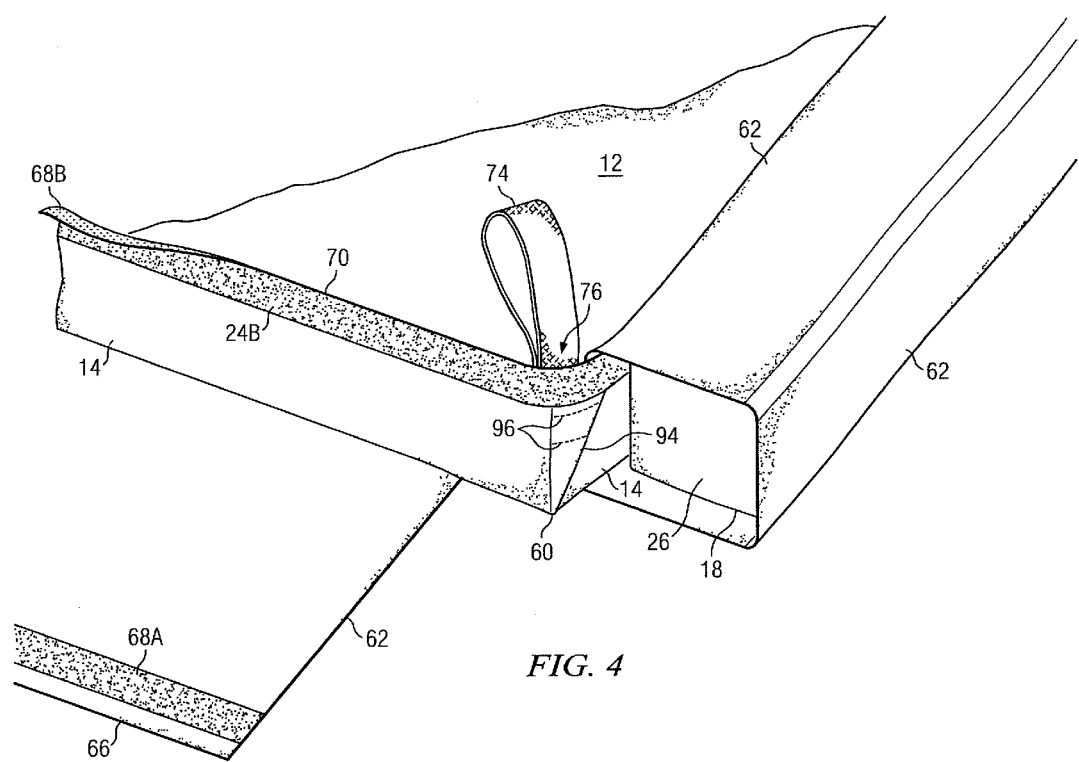
FIG. 4 illustrates the containment device with one bolster segment secured to a side wall of the tray portion of the containment device.
Figure 5:
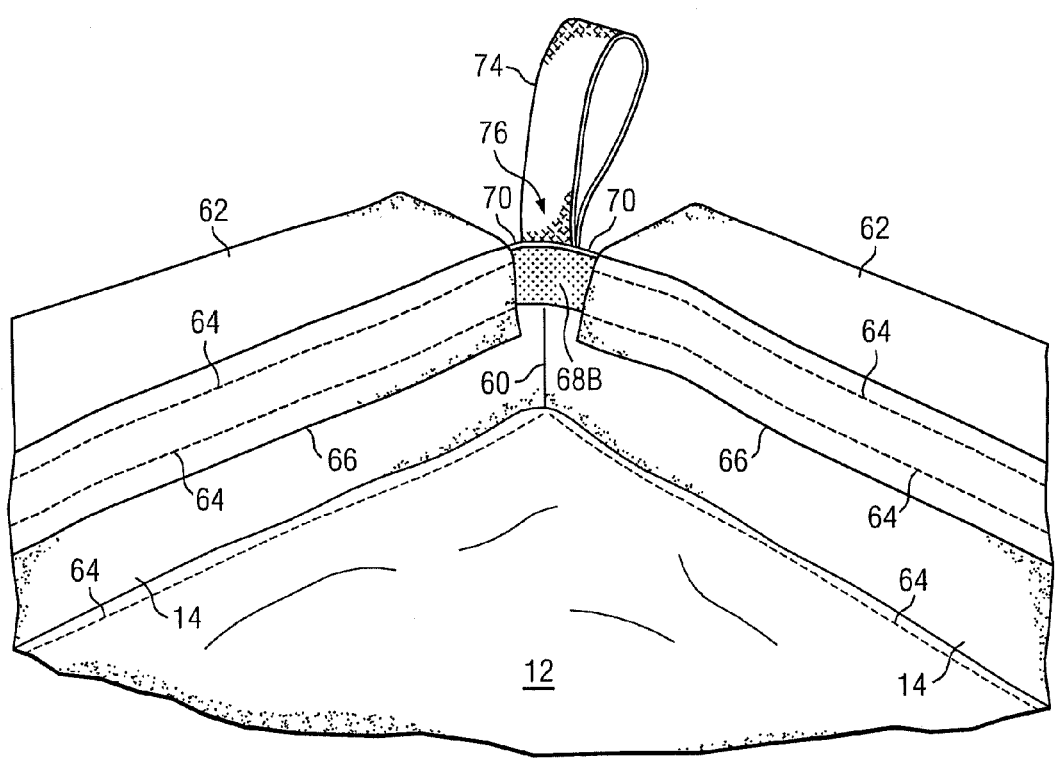
FIG. 5 illustrates a view of one corner of the containment device from inside the containment device.

FIG. 4 illustrates the containment device 10 with the bolster segment 18 secured to the one side wall 14 of the tray portion 12 of the containment device 10. Also visible in FIGS. 3, 4 and 5 is a handhold 74, a loop that is secured to the upper portion 70 of the side wall 14 at or near the corner 60. In one embodiment the handhold 74, made of heavy webbing strap approximately 2 inches wide, is secured between the inside of the upper edge 70 of the side wall 14 and either the second type 24B or 68B strip of the hook and loop fastener material by the same sewn seams 64 that secure these components together. If a single piece of hook and loop material folded in half lengthwise (one half on either side of the upper edge 70 of the side wall 14) is used for both 24B and 68B a slit may be made along the position of the fold between the two halves thereof and the two ends of the webbing strap loop inserted there between before securing with sewn seams. In other embodiments a handhold 74 may be similarly anchored to a side wall and located in at least one position anywhere around said containment tray. A plurality of handholds 74 may be positioned at intervals around the perimeter of the containment tray. Handholds 74, whether several are used or only one is used, may alternatively be installed either along the upper edge of the side walls as described or at other locations.

The webbing strap should be cut to a length of approximately 15 inches, doubled to form a loop 7½ inches long and sewn together with type 138 bonded thread at the ends for about two inches from the ends, forming a loop about five to 5½ inches long. The sewn end of the loop is then inserted through a slit in the folded second type (loop) material 24B, 68B along the upper edge 70 of the side wall 70 at each corner 60 of the containment device, and sewn again with the type 138 bonded thread. A plurality of such handholds 74 may similarly be placed at various intervals around the side wall 14 of the containment device 10, preferably at the corners of the containment device 10, to facilitate handling it as it is moved about during set up or repositioning. Another feature of the illustrated embodiment of the present invention is the detail shown at the corner 60 (same for all corners), including the folded corner flap 94 and the sewn seam 96 that secures the flap 84 to the side wall 14 as will be further described with FIG. 13 herein below.

FIG. 5 illustrates a view of one corner 60 of the containment device 10 from inside and just above the tray portion 12 of the containment device. Clearly visible are the outer edges 66 of the wing flaps 62 secured to the inside of the side walls 14 at their upper edges 70 using the first 68A and second 68B hook and loop fasteners as described. Thus secured, the side walls 14 are shown supported by and against the bolster segments 18 (not shown in FIG. 5 but understood to be enclosed within the extension flaps 62). The tray 12 and extension or wing flaps 62 of the containment device may be sewn together along seams 64 using size 138 bonded UV-inhibited polyester thread in a single needle lock stitch, for example. This thread may also preferably be used to sew other seams in constructing the containment device such as the first and second hook and loop fastening strips to their respective flaps and side walls, etc.

FIGS. 6 through 10 illustrate the steps for fabricating the bolster segment 18 shown and described in the foregoing figures. The bolster segment 18 incorporates a number of features that contribute to the utility of the invention. The material used for the bolster members is a resilient, open cell urethane foam product having a preferred density of approximately 1.8 lb. per cu. ft. and an indentation force deflection of 90 lb. in this illustrative example. These are nominal values found to be effective during experimentation but may be varied to suit particular applications. For example, these nominal values may be varied with satisfactory results within the range of approximately 1.4 to 2.2 lb/ft$^3$ and 70 lb. to 110 lb. respectively. Open cell foam is selected because it is fully resilient when compressed, returning to its original shape after the compressing agent is removed. For example, as the wheels of a vehicle roll over the bolster assembly 16 air in the cells of the foam escapes by passing from cell-to-cell, allowing the body of the foam to compress. As the compressing agent is removed, air seeps back into the foam cells, causing the cells to expand back to their original size and shape. The density of the foam and the indentation force deflection specifications are chosen to facilitate these properties of the bolster cores to function as intended in this application. Closed cell foam would not ordinarily be suitable for the bolster cores 30 because the closed cells would burst under compression and would not expand back to their original size and shape, thus reducing the resiliency and usable life of the bolster segments.

Figure 6:
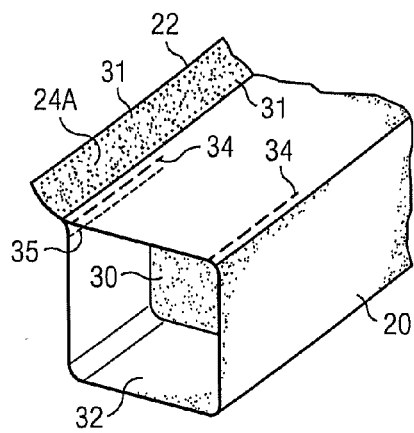
FIG. 6 illustrates a first step in assembling a bolster segment.

FIG. 6 illustrates a first step in assembling a bolster segment 18. In this example, a bolster core 30 is seven feet long and has a square cross section six (6.0) inches on a side. In other embodiments the cross section could be a right triangle six (6.0) inches on the two adjacent sides and having a hypotenuse of slightly less than 8.5 inches in the illustrated example. While the latter could save somewhat on the amount of coated fabric material need for the wing flaps 62 and could conceivably function as intended, it would have less durability than the six-by-six inch cross section because there would be less foam core material in the upper region of the bolster segment to support the side wall 14 structure of the containment device 10. In typical containment devices for use with trucks it is recommended that the bolster core cross section be at least six inches high, six inches wide at its base, and at least 3 inches wide across its upper side. Preferably, the cross section of the bolster segments will be a shape selected from the group consisting of a right triangle, rectangle, square, or other quadrilateral having at least one right angle corner. In practice, because of ease of manufacturing, foam core "sticks" having a square cross section may be the most economical as compared with sticks having other cross sections. Smaller cross sections for small containment devices may be suitable. Bolster member cores having a round cross section have the disadvantage of being unable to support the side walls in a fully vertical orientation, although their use in some applications may be satisfactory.

To form a bolster segment 18, the bolster core 30 is wrapped in a piece of the same PVC coated fabric described herein above to form a sleeve 20 that, for the illustrated example, is cut to approximately 20 inches longer then the five foot length of the bolster core 30, and about four-and-a-half inches wider than the length of the perimeter of the cross section of the bolster core 30. Note that for bolster members having heights greater than 6 inches, the excess fabric extending past each end will be approximately the height of the bolster core 30 plus four inches to allow sufficient material to form the package wrap to be described. For example, an eight inch high bolster core 30 will require about 12 inches excess length of the PVC fabric at each end.

Continuing with FIG. 6, generally, the hook and loop material 24A may be sewn together with the edges of the flap 22. Both long edges of the fabric sleeve 20 material are brought together and a strip of the first type 24A of the hook and loop material is positioned along it and sewn thereto along each edge of the hook and loop strip at the location indicated by the dashed lines 31 with size 138 bonded polyester UV-inhibited thread in a double needle lock stitch. This double thickness of material and the double needle stitch completes the operation in one pass through the sewing machine. It also may provide additional strength to reinforce the edges of the containment tray when it is dragged over the surface of the ground to position it in the desired location. In practice, the preferred process is to form the sleeve 20 first and then insert the foam core 30 into it from one end of the sleeve 20. This also facilitates the sewing operation, and is the reason that the circumference of the sleeve 20 is made slightly larger than the perimeter of the bolster member 30.

Figure 7:
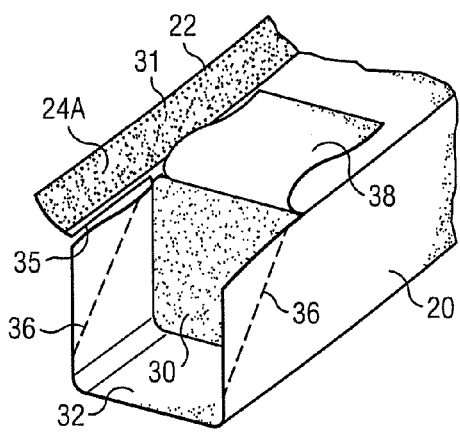
FIG. 7 illustrates a second step in assembling a bolster segment.

After the sleeve 20 is formed, and the foam core bolster member in position within the sleeve 20 leaving about 10 inches of excess sleeve length extending from each end of the foam core 30, several cuts may be made in the excess length of the coated fabric sleeve 20. These cuts, shown in FIGS. 6 and 7, facilitate forming a "package wrap" end panel for the sleeve 20. The package wrap will fully enclose the foam core 30. In a first step, the excess length 32 of the sleeve 20 is cut through each upper corner along the dashed lines 34, to a depth just to the end of the foam core 20. The flap 38 created by the two cuts 34 is folded back over the upper surface of the sleeve 20. In a second step a cut 35 is made aligned just outside the inner-most of the pair of sewn seams 31 from the end of the sleeve 20 to the end of the foam core 30 to separate the strip of fabric with the hook and loop strip 24A sewn to it from the rest of the excess length of the sleeve 20. In a third step a pair of cuts 36 is made in the sleeve, which are angled across the upper corners as shown in FIG. 7. This removal of excess material facilitates forming the package fold as will be described.

Figure 8:
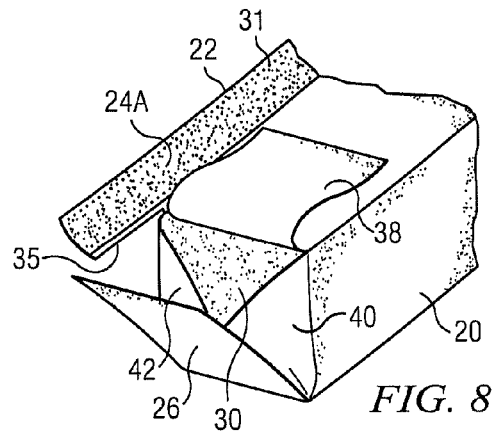
FIG. 8 illustrates a third step in assembling a bolster segment.
Figure 9:
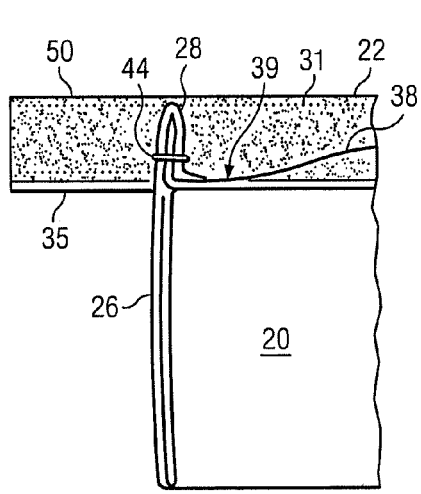
FIG. 9 illustrates a cross section view along the longitudinal centerline of the end of a bolster segment following the third step of FIG. 8.
Figure 10:
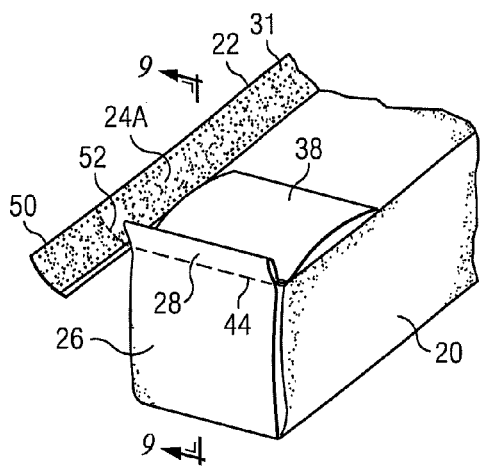
FIG. 10 illustrates a fourth step in assembling a bolster segment.

FIG. 8 illustrates a third step in assembling a bolster segment 18, the folding of the excess length 32 to form a "package wrap" end panel 26 for the bolster sleeve 20 to fully enclose the bolster core 30, thus providing a barrier against liquids from entering inside the sleeve 20. The package wrap forms the end panel 26 that seals the entire end of the bolster segment 18 except the two upper-most corners of the end panel 26. Thus, the end panel 26 will not leak unless the bolster segment 18 is turned on its side. In that orientation any liquid that may have entered inside the sleeve 20 will drain from the lowest-disposed upper corner because the upper corners are purposely not sealed. To form the package wrap, the two sides 40, 42 are folded inward toward each other while lifting the bottom portion of the excess length 32 (FIG. 7) against the end of the bolster core 30. The free end of the excess length 32 can then be folded over a gathered fold of the flap 38 and stapled with several staples 44 as shown in the cross section view of FIG. 9 to form the flap 28. This flap 28 secures the sleeve material to form the end panel 26. In a later step, the flap 28 is sewn along the line of staples with the type 138 bonded thread to permanently secure the flap 28 and the excess of the flap 38 and the free end 50 are trimmed and discarded. The free end 50 is trimmed along the dotted line 52 as shown in FIG. 10.

Figure 11:
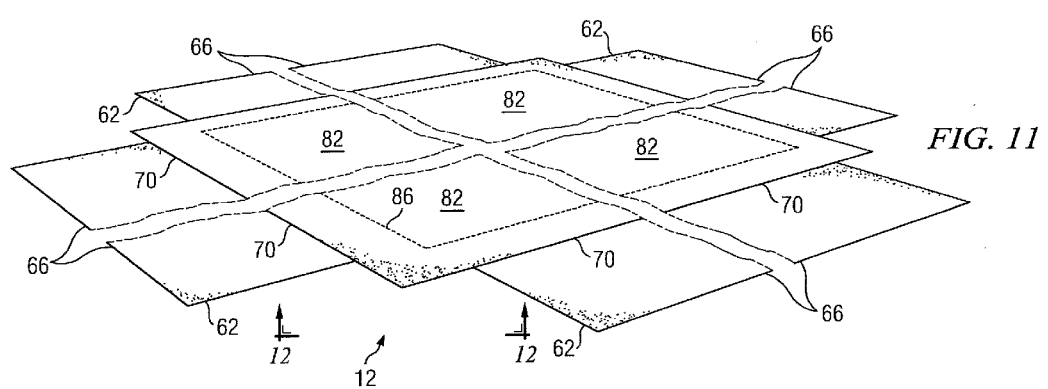
FIG. 11 illustrates a bottom panel of a containment tray according to the present invention with wing flaps attached to each side of the bottom panel.

FIG. 11 illustrates a bottom panel 82 of a containment tray 12 according to the present invention with wing flaps 62 attached to and extending from each side of the bottom panel 82. The bottom panel 82 is shown segmented at the dashed lines to indicate that various sizes of the containment tray may be formed using the same construction and components, merely scaling the dimensions to provide whatever size is needed. Persons skilled in the art will realize that in practice only a few sizes of the components may be adapted to form a wide variety of sizes and shapes of the drip containment device described herein. The inward edge of each wing flap 62 may be welded or heat sealed and sewn (using the same type 138 bonded thread as in previous steps) to the underside of the bottom panel 82 by vulcanized seams 86 spaced a distance=side wall height+one inch away from the edge of the bottom panel 82 material (which is the same as the upper edge 70 of the side wall when the containment tray 12 is formed). In this example, the seam attaching the wing flap 62 to the bottom panel 82 is seven inches inward from the edge 70. Other methods of securing the extension flaps 62 to the containment tray 12 may be used as long as a liquid-impervious joint having the required mechanical strength is provided.

Continuing with FIG. 11, for smaller containment devices the bottom panel 82 may be a single piece of the PVC coated fabric described previously. Typically, however, the bottom panel 82 is formed of several pieces using vulcanized seams 86 such as those used to attach the wing flaps 62 to the bottom panel 82. A seam vulcanizing machine well known in the art may be used. A seam formed in this manner provides a high resistance to sheer forces (in the plane of the fabric panel at right angles to the seam) but lesser resistance to tearing forces (for example, pulling two ends of a seam away from each other and away from the plane of the panel). For instance, to form a containment tray 12 for a containment device 10 of twelve feet by twenty-nine feet in this example, three lengths of the coated fabric cut from a standard roll 61 inches wide are needed. The three lengths are then placed side by side with just enough overlap—typically about one inch—at the adjoining edges for a seam to be vulcanized or welded.

Figure 12:
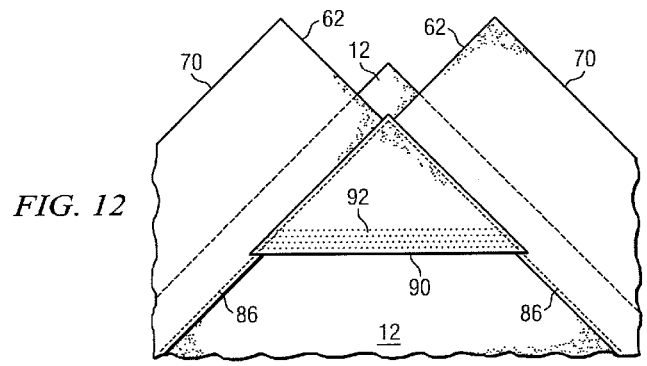
FIG. 12 illustrates a view of the underside of the containment tray at one corner depicting a gusset installed to reinforce the corner region of the containment tray.

FIG. 12 illustrates a view of the underside of the containment tray 12 at one corner 60 thereof depicting a gusset 90 installed to reinforce the corner region of the containment tray 12. The gusset 90 reinforces the corner structure of the containment device 10 and is especially helpful when a pull handle 74 is attached at the corners 60 thereof. The gusset 90 may be attached by a thermal weld at least in the region 90 (and preferably over its full area).

Figure 13:
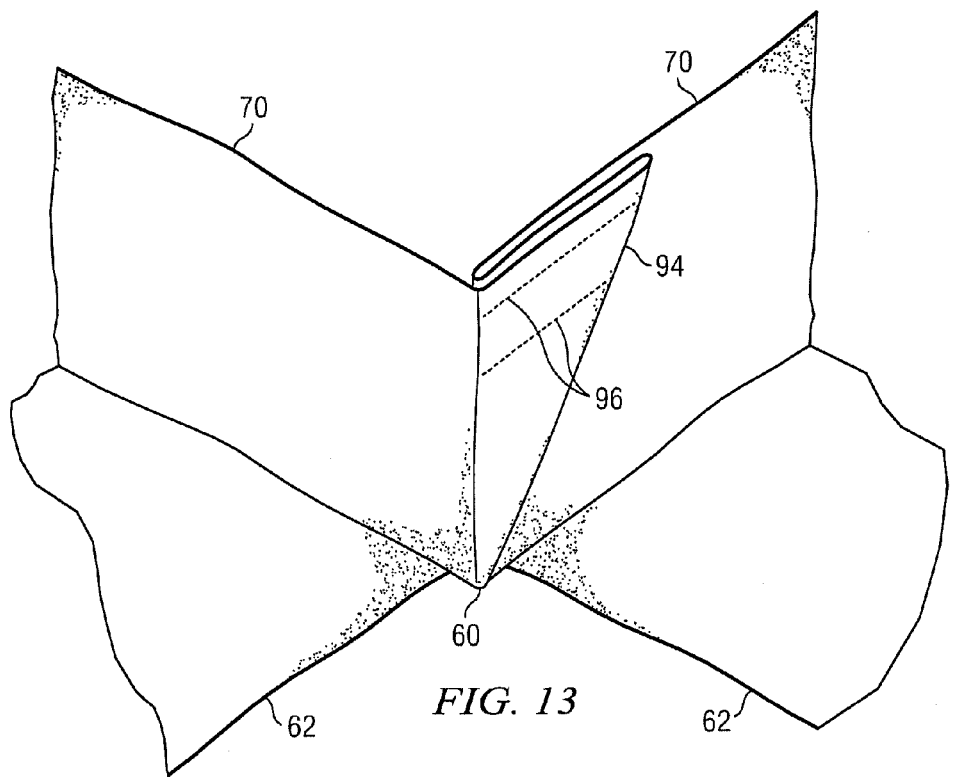
FIG. 13 illustrates a view of a corner of the containment tray depicting the construction of the side walls at the corner thereof.

FIG. 13 illustrates a view of a corner of the containment tray depicting the construction of the side walls 14 at the corner 60 thereof. The corner is formed by gathering the side wall 14 material and folding the triangular shape 94 thus formed against one of the side walls 14 adjacent the corner 60, where the triangular shape may be temporarily stapled until it can be sewn along at least two lines parallel to the upper edge of the side wall as indicated by the dashed lines 96.

Figure 14:
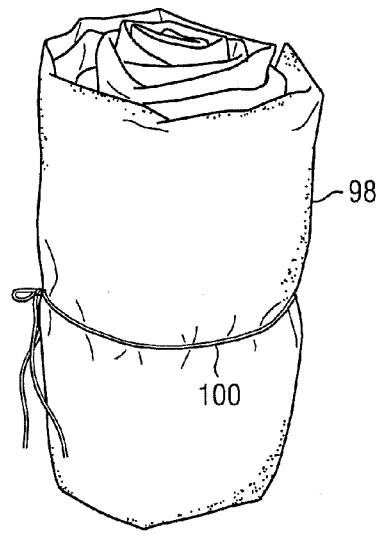
FIG. 14 illustrates a containment tray after it has been folded and rolled into a compact bundle for transport, storage, and reuse.

FIG. 14 illustrates a containment tray after it has been folded and rolled into a compact bundle 98, and secured with a rope 100 for transport, storage, and reuse. In place of the rope 100 an elastic cord or belt may be used. In the illustrated example, of a 12'×29' containment device, the bundle 98 and the rope 100 together will weigh approximately 65 lb. and the bolster segments (ten each of the 7 foot length and two each of the 4 foot length) together weigh approximately 35 lb. for a total weight of approximately 100 lb. This demonstrates the ready portability of the containment device 10 according to the present invention.

CONCLUSION

While the invention has been described in detail in only one of its forms, it is not thus limited but is susceptible to various changes and modifications without departing from the spirit thereof. Many of these variations are mentioned in the foregoing detailed description. The alternatives mentioned are provided to illustrate useful variations but not intended to limit the invention to specific embodiments. For instance, the materials selected for the illustrated embodiment may be varied to accommodate particular applications without departing from the spirit of the invention as set forth in the claims. Other examples of variations are the number and location of handholds, the height of the side walls, the shape of the containment device, the type of fasteners used to secure the wing flaps to the upper edge of the side walls, the number and sizes of the bolster segments, etc. Wing flaps may be configured to fully enclose the bolster segments or be configured as narrower flaps that are used at intervals around the perimeter of the containment tray yet still sufficient to retain the bolsters in position to support the side walls. Moreover, while the apparatus described herein is named a portable drip containment device for use under a vehicle, the device may have numerous other uses even though it's construction falls within the scope of and the recitations in the claims. Any application requiring a spill-containing tray may be readily satisfied by using a device as claimed and described herein. The novel combination of the compressible and reusable bolsters used to fully support the side walls of the tray that may be repeatably secured to or disassembled from the containment tray without tools and the convenient portability of the device for transport and storage provide utility not heretofore available.

What is claimed is:

1. A reusable bolster system for supporting upward-extending side walls of a fabric containment tray without the use of tools, comprising:
   a resilient core formed from a synthetic foam material cut to a defined length and a defined cross section;
   a system of flaps attached to the containment tray and extending outward therefrom; and
   the flaps are configured for wrapping around the resilient core placed adjacent a respective upward-extending side wall of the containment tray and for removably attaching the core to the containment tray.

2. The bolster system of claim 1, comprising:
   a sleeve conformably enclosing the resilient core to form a bolster segment, the sleeve fabricated from a chemically resistant fabric wherein the sleeve includes at least one air vent at each end of the bolster segment; wherein the air vent is disposed proximate an upward side of the bolster segment when attached to the side wall of the tray.

3. The bolster system of claim 1, comprising:

a fastening mechanism configured for attaching the flaps to the upward-extending side walls at each of a plurality of selected intervals around the containment tray.

4. The bolster system of claim 3, wherein:

a first portion of the fastening mechanism is disposed at a distal portion of the flap for securing to a corresponding second portion of the fastening mechanism disposed on the upward-extending side wall.

5. The bolster system of claim 3, wherein:

the fastening mechanism is selected from the group consisting of a hook and loop fastener, and a spring clip, a lace, a cord, and a combination thereof.

6. The bolster system of claim 1, wherein:

the flaps are formed to have a width extending along substantially the length of each of the side walls of the containment tray.

7. The bolster system of claim 1, wherein:

the flaps are formed as narrow flaps spaced at intervals along substantially the length of each side wall.

8. The bolster system of claim 1, wherein:

the cross section of the core includes at least two sides forming a right angle, one side of said right angle having a dimension substantially equal to a height of the side wall of the tray.

9. The bolster system of claim 1, wherein:

the flaps when wrapped around the resilient core enclose at least a portion of the resilient core.

* * * * *